(12) United States Patent
Mukherjee et al.

(10) Patent No.: US 8,935,239 B2
(45) Date of Patent: Jan. 13, 2015

(54) KNOWLEDGE MANAGEMENT FOR SOLUTION DESIGN DURING SALES AND PRE-SALES

(71) Applicant: International Business Machines Corporation, Armonk, NY (US)

(72) Inventors: Debdoot Mukherjee, New Delhi (IN); David C. D'Lima, Bangalore (IL); Sugata Ghosal, New Delhi (IN); Monika Gupta, New Delhi (IN); Vibha S. Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/684,805

(22) Filed: Nov. 26, 2012

(65) Prior Publication Data

US 2014/0149185 A1   May 29, 2014

(51) Int. Cl.
*G06F 17/30* (2006.01)
*G06Q 10/00* (2012.01)
*G06Q 30/00* (2012.01)
*G06Q 10/06* (2012.01)

(52) U.S. Cl.
CPC .................................. *G06Q 10/0637* (2013.01)
USPC ......................................... 707/723; 707/736

(58) Field of Classification Search
CPC ............... G06Q 30/06; G06Q 30/0611; Y10S 707/99933
USPC ................ 707/723, 736; 705/26.7, 7.29, 7.35
See application file for complete search history.

(56) References Cited

U.S. PATENT DOCUMENTS

| | | | |
|---|---|---|---|
| 6,356,909 B1 * | 3/2002 | Spencer | 1/1 |
| 7,996,441 B2 | 8/2011 | Johnson et al. | |
| 2001/0037213 A1 | 11/2001 | Kinoshita | |
| 2002/0069154 A1 * | 6/2002 | Fields | 705/37 |
| 2003/0200168 A1 | 10/2003 | Cullen, III et al. | |
| 2006/0074725 A1 | 4/2006 | Huang et al. | |

(Continued)

FOREIGN PATENT DOCUMENTS

WO    2012030333 A1    3/2012

OTHER PUBLICATIONS

Kristekova et al., TowardS Prioritzing IT Solution Developments through System Dynamics and Fuzzy Logic, System Science (HICSS). Jan. 4-7, 2012.

(Continued)

*Primary Examiner* — Cheryl Lewis
(74) *Attorney, Agent, or Firm* — Ryan, Mason & Lewis, LLP (57) ABSTRACT

Techniques, a system and an article of manufacture for designing integrated enterprise solutions. A method includes aggregating multiple work-products pertaining to solutions submitted in response to one or more previous solution requests, segmenting the multiple work-products into multiple segments based on content category, annotating each of the multiple segments with a tag based on one or more semantic associations with the content of each of the segments, adding each of the segments and each of the tags into a database, performing a search in the database to identify a set of one or more of the segments with at least one tag that corresponds to content of a current solution request, and ranking each of the segments in the set based on a degree of semantic matching with one or more parts of the current solution request.

20 Claims, 5 Drawing Sheets

(56) References Cited

U.S. PATENT DOCUMENTS

| | | |
|---|---|---|
| 2007/0016514 A1 | 1/2007 | Al-Abdulqader et al. |
| 2008/0183514 A1 | 7/2008 | Moulckers et al. |
| 2008/0312992 A1 | 12/2008 | Hoshi et al. |
| 2009/0228512 A1 | 9/2009 | Chopra et al. |
| 2011/0083120 A1 | 4/2011 | Bhandar et al. |
| 2011/0099470 A1 | 4/2011 | Ananthanarayanan et al. |
| 2011/0167070 A1 | 7/2011 | Ananthanarayanan et al. |

OTHER PUBLICATIONS

Derguech et al., Towards a Framework for Business Process Models Reuse, Workshop at International Conference on Advanced Information Systems Engineering (CAiSE'10), 2010.

Markovic et al., A Framework for Querying in Business Process Modeling, in Proc. Multikonferenz Wirtschaftsinformatik, 2008.

Andreou, Ontologies and Query Expansion, Master of Science, School of Information, University of Edinburgh, 2005, http://www.inf.ed.ac.uk/publications/thesis/online/IM050335.pdf.

* cited by examiner

KNOWLEDGE MANAGEMENT FOR SOLUTION DESIGN DURING SALES AND PRE-SALES

FIELD OF THE INVENTION

Embodiments of the invention generally relate to information technology, and, more particularly, to enterprise solution management.

BACKGROUND

During sales, pre-sales and/or bid preparation, a solutioning team collaboratively creates work products depicting an enterprise solution to be proposed as part of the bid. The input to the process can be a request for response, intent, tender or some form of opportunity description. Based on this input, the team creates work products such as a proposal, which outlines the technical solution, assumptions, value propositions, etc. The team can also create work products such as a staffing plan and other estimates, as well as a risk assessment.

Information needs of the solutioning practitioners can be particularly intense. Thus, effectively harvesting the information created in past bids and contextually providing the same in future bids can be of much value. In existing approaches, teams rely on personal contacts for assistance and recommendations, while available search capabilities in data warehouses that archive solutioning information are limited to simple keyword searches on documents. However, content recommendations can be potentially disadvantageous if the recommendations are not targeted and/or precise.

Additionally, in multi-vendor bid preparation (within or across organizations), while individual units can offer precision in their sales configurations, integration among those is often lacking, resulting in low precision in the overall solution, a long cycle time, operational inefficiency during solutioning, and reduced win rate. There can also exist a large amount of unstructured information created, modified and shared amongst teams via informal dialogs, phone calls, emails, etc. over the solutioning engagement lifecycle. Further, a variety of individuals involved in the system often need a varied level of traceability on how other individuals arrive at decisions during the opportunity-to-order process.

Accordingly, a need exists to industrialize the way client needs are addressed in the design of various components of an integrated enterprise solution.

SUMMARY

In one aspect of the present invention, techniques for knowledge management for solution design during sales and pre-sales are provided. An exemplary computer-implemented method for identifying one or more solution segments in response to a current solution request can include steps of aggregating multiple work-products pertaining to solutions submitted in response to one or more previous solution requests, segmenting the multiple work-products into multiple segments based on content category, annotating each of the multiple segments with a tag based on one or more semantic associations with the content of each of the segments, adding each of the segments and each of the tags into a database, performing a search in the database to identify a set of one or more of the segments with at least one tag that corresponds to content of a current solution request, and ranking each of the segments in the set based on a degree of semantic matching with one or more parts of the current solution request.

In another aspect of the invention, an exemplary computer-implemented method for providing a solution recommendation based on segments of previous solution documents can include steps of automatically harvesting existing solution documents submitted in response to one or more previous solution requests, decomposing each solution document into one or more segments pertaining to information regarding a specific solutioning concept, tagging one or more keywords of interest in each of the one or more segments, said one or more keywords pertaining to a specific solutioning concept, and indexing the one or more segments of each solution document into a repository with the one or more keywords configured as one or more search facets. The method also includes running a current solution request against the repository to identify one or more of the segments with a tag that corresponds to content of the current solution request, weighting the identified segments based on one or more characteristics of the current solution request, ranking the weighted identified segments based on coverage in the current solution request and selecting one or more of the highest-ranked segments to be provided as a solution recommendation for the current solution request.

Ranking the segments can be based, for example, on criteria such as: a) coverage in the solution request, b) relevance to the information already captured in the draft solution under preparation, c) recency of the work-product from where the segment is derived, d) relevance to the role of the person to whom the solution recommendation is targeted, e) indicators about quality of the past solution from where the segment is derived (whether the opportunity was won, whether the solution ran into delivery issues, etc.), f) explicit user ratings on the work-product, and g) automatically computed popularity scores for the work-products based on number of times each has been downloaded from a knowledge repository.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes integrated enterprise solution design. At least one embodiment of the invention includes providing context-based content recommendations via use of association rules extracted over concepts and existing semantic tags in a document repository to add new tags to indexed documents and expand contextual queries with relevant concept-values.

Various terms used herein are detailed below. For example, as used herein, a vendor refers to the company or enterprise that creates a solution in response to an opportunity expressed in a request for proposal (RFP) or through informal channels. Also, a customer refers to the organization who requests proposals for solutions from vendors for certain enterprise requirements at the organization, and competition for a particular vendor refers to other vendors who submit solutions in response to the RFP initiated by the customer. Additionally, as used herein, a segment refers to a section of information regarding a specific solutioning concept.

Also, a document refers to any type of file, in a potential variety of formats. Each document contains information under one or more concepts, and at least one embodiment of the invention includes segmenting the contents of a document under different solutioning concepts using standard tools. Additionally, as used herein, tags refer to keywords and/or phrases found inside a document. Tags are labeled by a concept.

As described herein, at least one embodiment of the invention includes providing a workspace for pre-sales solutioning with capabilities such as the following. For example, a semantic search over artifacts created as part of solutions proposed in past engagements can be carried out based on opportunity characteristics, resulting in content recommendations for a current project. Recommendations may be provided on different solution artifacts including win-themes, value-propositions, solution summaries, architecture diagrams, estimation models, staffing plans, project plans, risks, assumptions, etc. Contextual guidance and/or recommendations can be provided at each step of solution design. At least one embodiment of the invention also includes identifying available experts, forming a solutioning team in a semi-automatic manner, and selecting solutions and/or assets from a set of candidate solutions and/or assets in a guided manner.

Further, automatic asset harvesting can be carried out with rich metadata at the end of the engagement to enrich the knowledge repository. As part of asset harvesting, all solution artifacts created in an engagement can be suitably cleansed of sensitive information, updated with meta-data for the engagement (for example, descriptive tags, industry, technology, and/or contract value) and submitted to the knowledge repository such that future engagements can derive insights therefrom. At the time of harvesting, it should be ensured that the information, if shared across the organization, does not violate any non-disclosure agreements that may exist.

An aspect of the invention also includes auto-creating a bid and/or solution summary to enable reuse in new or subsequent engagements via digital curation of legacy knowledge artifacts, which may not have been created with the help of the disclosed solutioning workspace.

As also detailed herein, at least one embodiment of the invention includes seamless bootstrapping of a delivery phase with solutioning artifacts such as, for example, solution architecture and key design decisions.

Figure 1:
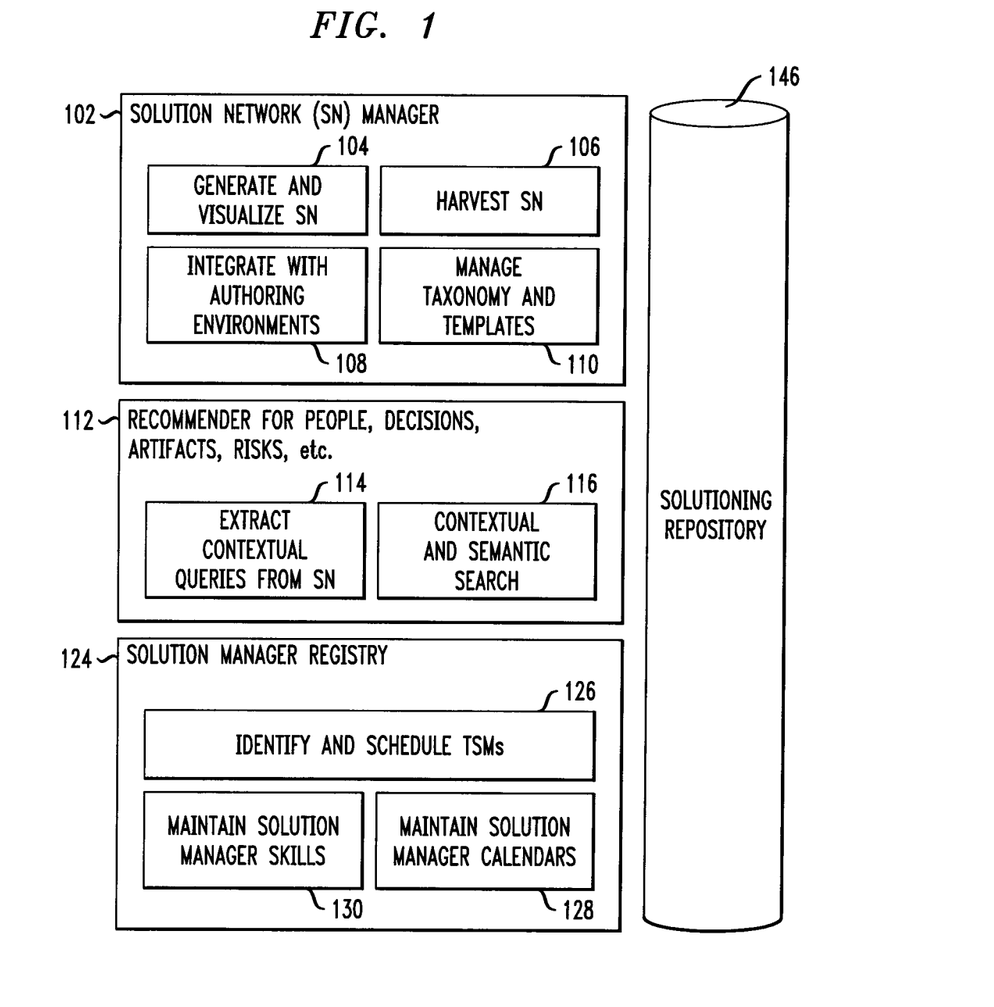
FIG. 1 is a block diagram illustrating an example embodiment, according to an aspect of the invention.

FIG. 1 is a block diagram illustrating an example embodiment, according to an aspect of the invention. By way of illustration, FIG. 1 depicts a solution network (SN) manager component 102, a recommender component 112, a solution manager registry component 124, and a solutioning repository 146. As described herein, the SN manager component 102 carries out actions of generating and visualizing the SN (step 104), harvesting the SN (step 106), integrating authoring environments (step 108) and managing relevant taxonomy and templates (step 110).

At least one embodiment of the invention includes automatically creating a solution network that includes tasks, artifacts, decisions, risks, issues, people, etc., associated with a solution design engagement. Such a solution network may be used as context to derive content recommendations from a knowledge repository. The solution network provides complete traceability of inter-relationships between tasks, artifacts, decisions, issues, risks, assumptions and conditions that are relevant and/or important to the solution under design.

As noted herein, at least one embodiment of the invention also includes automatic asset harvesting or derivation from solutioning engagements. Solution elements can be harvested as a solution network into the solutioning repository 146 for future reuse. At least one embodiment of the invention can also include auto-summarizing a bid and solution, and using this summarization to search for relevant information in new and/or subsequent engagements.

More specifically, harvesting can include obtaining all documents created as part of a pre-sales bid, and associating any structured information on deal characteristics (client, sector, industry, etc.) captured in forms in bid authoring/approval tools. Each bid document is decomposed into granular segments, each of which pertains to information regarding a specific solutioning concept. Additionally, keywords or phrases of interest can be tagged inside each chunk of content (that is, segmented text specific to a concept).

At least one embodiment of the invention additionally includes indexing the document collection as a single case. Starting from a seeded solutioning taxonomy, an aspect of the invention can include creating a semantic tag-net over time from tags extracted from the solutioning documents. The tag-net captures different kinds of relationships across concepts, tags and content segments. Also, association rules can be extracted from co-occurrence of tags in solutioning projects, and fuzzy tags can be added to documents using such association rules. For example, suppose X and Y are two tags occurring in W*100% of the projects. Then, for a new project, at least one embodiment of the invention can include applying the tag Y with fuzziness of W, if the project is already tagged as X. Such association rules can also help in query expansion. For instance, if X is a term or a synonym of a term in the user's query, then at least one embodiment of the invention may include expanding the query by adding the term Y. Further, in at least one embodiment, where the different terms in a query are weighted to different degrees, the weight of the newly added term Y may be computed as W times the weight of the term X.

Further, the recommender component 112 carries out actions of extracting contextual queries from the SN (step 114) and performing a contextual and semantic search (step 116). At least one embodiment of the invention includes identifying subject matter experts (SMEs) and/or architects that can create different aspects of the solution with a contextual person search. Accordingly, searching for different solution elements (artifact, people, decisions, alternatives, risk, issues, estimates, etc.) can be carried out as follows. A query is created with the current solution network as context, and the query is run in a repository to search for similar solution elements to those specified in the query. The links are traversed, starting from these query results, to find solution elements of the desired type mentioned in the query, and such solution elements are ranked and returned as results.

Additionally, at least one embodiment of the invention includes parsing a current context that includes information already produced for the bid as well as deal characteristics. A subsequent contextual search can include using the above context to create a query, which is a combination of structured fielded queries and free text keyword queries. This is an "or" query. Alternate context possibilities can be displayed to a user through query expansion, leveraging association rules extracted in a semantic tag-net, wherein context is further editable by the user. Also, search results can be ranked based on, for example, coverage in the query (that is, level of match), dependence between the concept of the target segment and concepts used in the queries, confidence of the query expansion rules, and fuzziness of the tags in the document. These ranking criteria can be in addition to the criteria detailed elsewhere herein.

Also, in connection with FIG. 1, the solution manager registry component 124 carries out actions of identifying and scheduling technical solution managers (TSMs) (step 126), maintaining solution manager skills (step 130) and maintaining solution manager calendars (step 128). As described herein, at least one embodiment of the invention includes automatically assigning technical solution managers to lead the solution creation of a deal based on information on availability, skills and expertise levels of a pool of solution managers, as well as client intent, deal characteristics and timelines.

Accordingly, as described herein, aspects of the invention include providing a system that takes input about client properties (industry, geography, buying behavior, etc.) and intent of the solution expressed in the client-issued request for proposal (RFP) or request for information (RFI) (or as expressed as common intent of clients from same industry, geography, etc.), and generating a ranked set of starter artifacts by searching a repository, to be edited by a solutioning team.

Additionally, in at least one embodiment of the invention, the system captures solutioning outcomes and status from delivery cycles (for example, project health and financials) and uses those in recommending a starter set for a new solutioning engagement. Further, in an example embodiment of the invention, the system allows a practice team to upload standardized sets of information to use for specific deal types, industry, technology, etc., and also provides a delivery team a starter set of information upon which the delivery is to be based.

Figure 2:
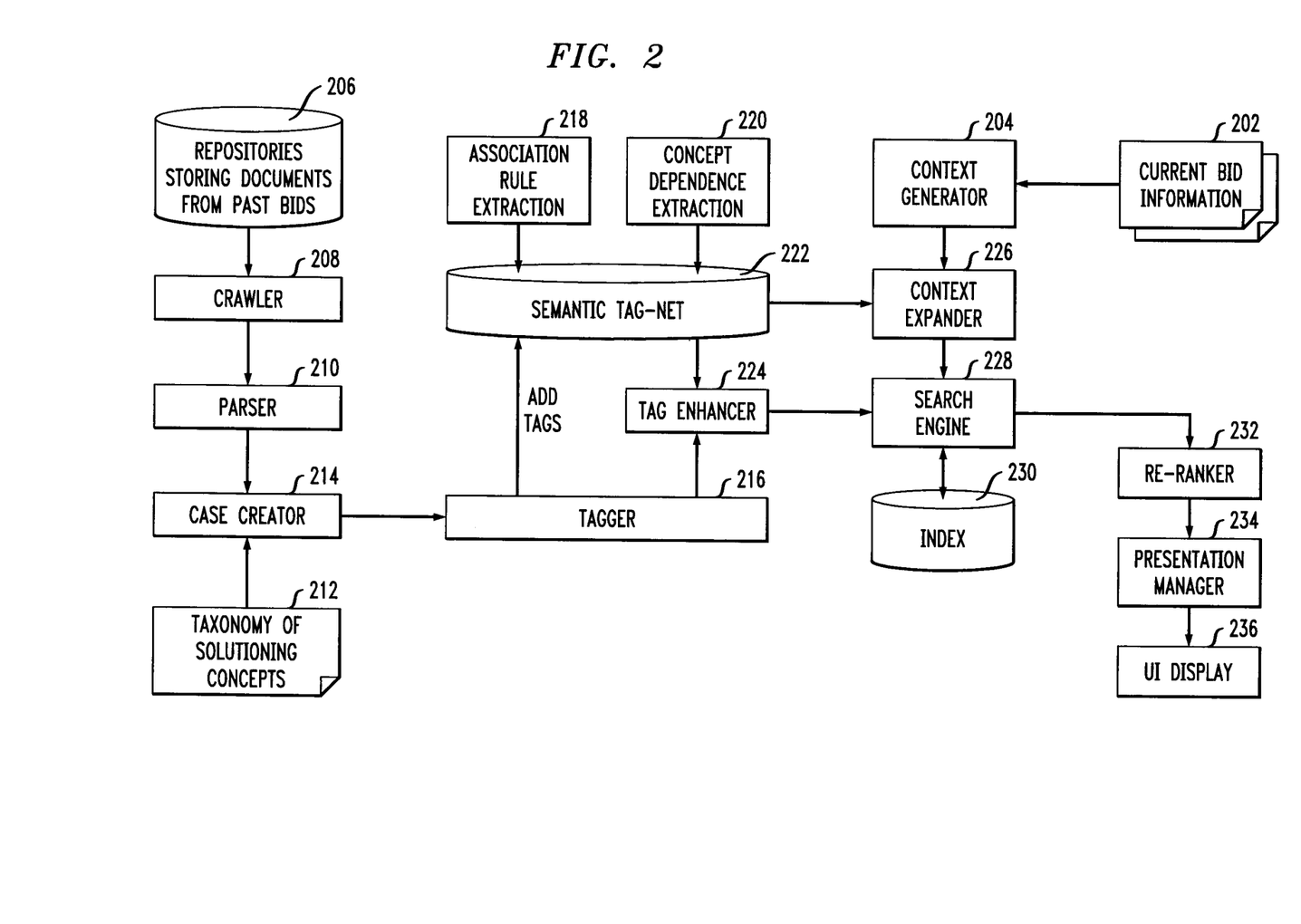
FIG. 2 is a block diagram illustrating an example embodiment, according to an aspect of the invention.

FIG. 2 is a block diagram illustrating an example embodiment, according to an aspect of the invention. By way of illustration, FIG. 2 depicts a repository 206 of work-products pertaining to pre-sales that detail a solution to be submitted in response to a RFP and/or RFI. A case creator component 214 traverses the repository 206 via crawler component 208, aggregates different work-products for every engagement and adds structured deal information as meta-data (for example, user provided structured fields in various workflow tools). Also, the case creator component 214 segments the document contents via parser component 210 under the different concepts in solutioning taxonomy 212. Specifically, parser component 210 parses documents into semantic categories and infers keywords from each category. Further, case creator component 214 converts the parsed documents to a single document that can be indexed with appropriate back links embedded to point to an appropriate location in the original documents.

As also depicted in FIG. 2, tagger component 216 employs annotators to identify tags within segments, and adds these tags as meta-data for the segment. If the concept label for the identified tag(s) is known from a semantic tag-net database 222, the same is added into the segment meta-data. Else, the tag is added as a new, unknown tag in the semantic tag-net database 222.

Accordingly, the semantic tag-net database 222 is a data structure that stores different types of relationships (co-occurrence, implication rules, synonymy, value-of, related to, etc.) between concepts, tags, and segments found in solutioning documents. Semantic tag-net database 222 receives input, for example, from association rule extraction module 218 as well as concept dependence extraction module 220.

Tag enhancer component 224 adds new fuzzy tags for each segment on the basis of association rules in the semantic tag-net database 222. Also, the tag enhancer component 224 adds each segment into search engine index 230 as well as to the semantic tag-net database 222, and creates appropriate connections for the newly added tags and segments. Additionally, in at least one embodiment of the invention, an expert seeds the tag-net database 222, periodically reviews the contents, and adds unknown tag labels and connections. Further, at least one embodiment of the invention includes periodically updating association rules (via extraction module 218) and concept dependences (via extraction module 220).

As detailed herein, an aspect of the invention also includes searching. By way of illustration, consider a concept under design, X. As used herein, context refers to a set of (concept, value) pairs for already known concepts that are related to X. For each record in the context, at least one embodiment of the invention includes creating a fielded query to match the value in the past records of the concept. As depicted in FIG. 2, for example, given a bid 202 being worked upon, context generator component 204 extracts the context from the existing information uploaded. This can include a fat query composed on structured and unstructured content, and may be represented as a set of (concept, tag/segment) pairs.

Additionally, from the fielded queries noted above, an OR query, Q, is created. Further, association rules in the semantic tag-net database 222 can be leveraged by context expander component 226 to add more (concept, value) pairs to the context, and a user may review and/or edit the context expansion, if so desired.

A full text search is run for Q to obtain a set of deals, each listing a corresponding degree of matching along the different query parts in Q. Specifically, as depicted in FIG. 2, search engine 228 searches the existing case repository index 230 using the created query Q. Subsequently, intelligent re-ranking component 232 aggregates ranks for each deal returned in the search results by appropriately weighting, for each (concept, value) in Q, the degree of match found for the concept, the dependence between the concept, and X, the confidence of the query expansion rule (if applied to generate the query part) and the fuzziness of (concept, value) in the search result.

The resulting output set of the search results, {<Record of X, Rank>}, is forwarded to a presentation manager component 234, which prepares the search result for presentation and queries the index for further information to be displayed alongside the search result such as, for example, important facets and their values, topic trends manifested in the search results, and statistics about various numeric fields describing the engagement. The results are ultimately output to a user interface (UI) display 236.

Figure 3:
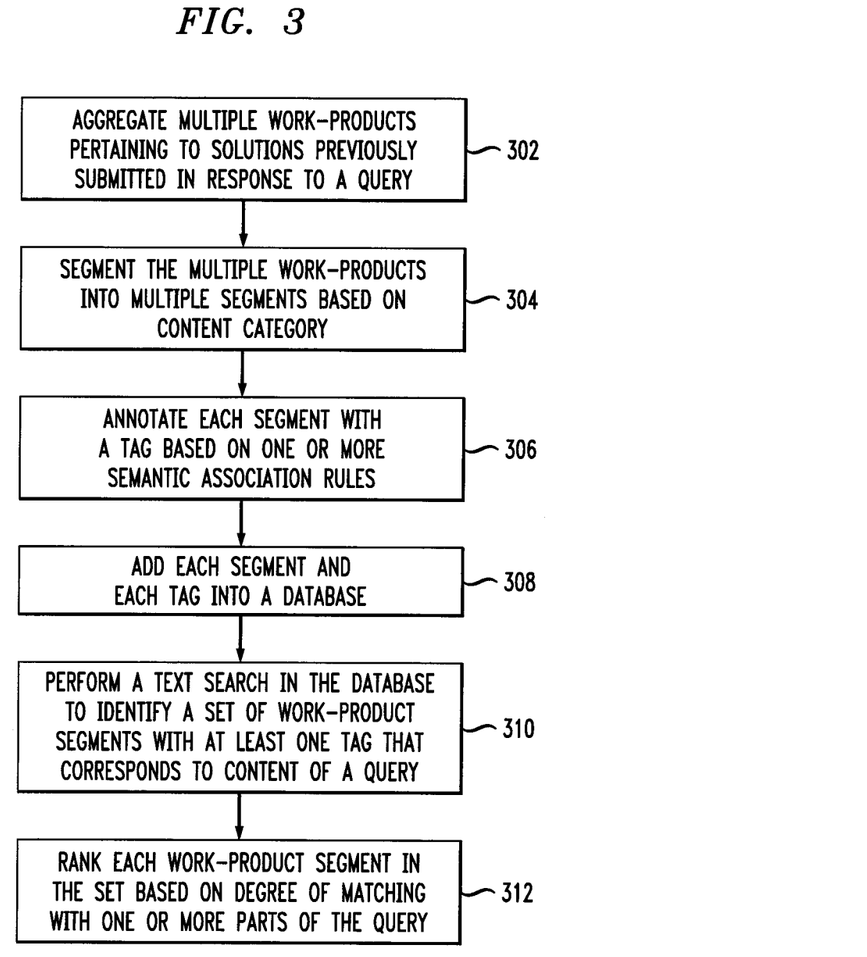
FIG. 3 is a flow diagram illustrating techniques for identifying one or more solution segments in response to a current solution request, according to an embodiment of the invention.

FIG. 3 is a flow diagram illustrating techniques for identifying one or more solution segments in response to a current solution request, according to an embodiment of the present invention. Step 302 includes aggregating multiple work-products pertaining to solutions submitted in response to one or more previous solution requests. Step 304 includes segmenting the multiple work-products into multiple segments based on content category. Step 306 includes annotating each of the multiple segments with a tag based on one or more semantic associations with the content of each of the segments. As detailed herein, annotating can include annotating each segment with a new fuzzy tag.

Step 308 includes adding each of the segments and each of the tags into a database. Step 310 includes performing a search in the database to identify a set of one or more of the segments with at least one tag that corresponds to content of a current solution request. Step 312 includes ranking each of the segments in the set based on a degree of semantic matching with one or more parts of the current solution request. At least one embodiment of the invention additionally includes outputting said ranking of work-product segments to a display.

As noted herein, ranking can be based on at least one of (i) coverage in the solution request, (ii) relevance to information already captured in a solution under preparation, (iii) recency of the work-product from where the segment is derived, (iv) relevance to a role of a person to whom the solution segments are provided, (v) one or more indicators about quality of a past solution from where the segment is harvested, (vi) a explicit user rating on the work-product, and (vii) an automatically computed popularity score for each work-product based on the number of times each work-product has been downloaded from a database.

The techniques depicted in FIG. 3 can also include adding structured information to each work-product segment as meta-data. Additionally, at least one embodiment of the invention includes identifying a pre-existing tag associated with each work-product segment and adding the pre-existing tag to each work-product segment as meta-data. Further, the techniques depicted in FIG. 3 can also include weighting each tag based on one or more solution needs.

Additionally, at least one embodiment of the invention includes performing a semantic search over said work-products pertaining to solutions submitted in response to previous solution requests based on opportunity characteristics to generate content recommendations for the solution request. Further, the techniques depicted in FIG. 3 can include considering risks, issues, assumptions and/or preconditions pertaining to the solution request, as well as identifying one or more experts to select a solution and/or one or more segments from a set of candidate solutions and/or segments.

At least one embodiment of the invention can also include bootstrapping delivery of segments. The techniques depicted in FIG. 3 can additionally include automatically assigning a solution manager to select work-product segments based on information on availability, skill and expertise level of multiple solution managers.

Further, the techniques depicted in FIG. 3 can include preparing segment evaluation criteria via setting and/or refining values for criteria based on values learned from past solutions, as well as considering input pertaining to client properties and intent expressed in the solution request.

Figure 4:
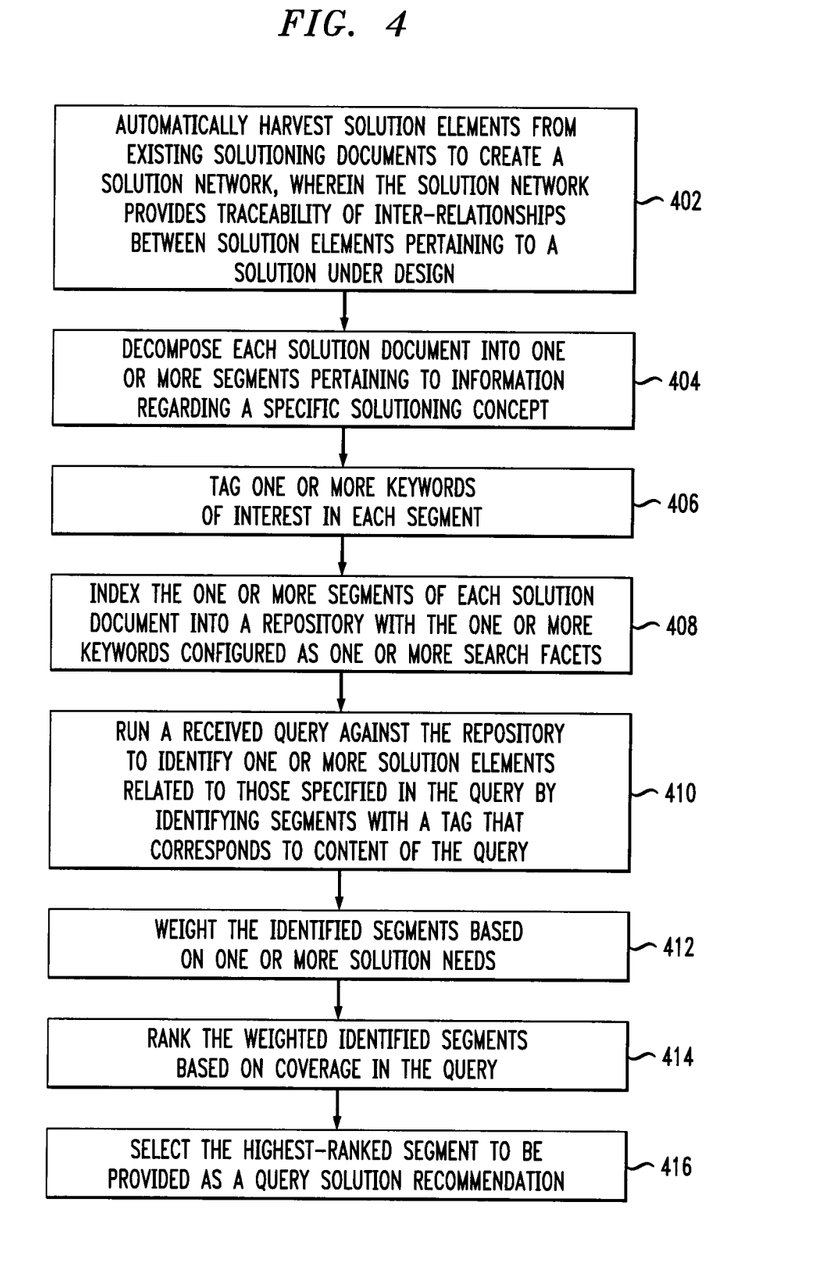
FIG. 4 is a flow diagram illustrating techniques for providing a solution recommendation based on segments of previous solution documents, according to an embodiment of the invention.

FIG. 4 is a flow diagram illustrating techniques for providing a solution recommendation based on segments of previous solution documents, according to an embodiment of the invention. Step 402 includes automatically harvesting existing solution documents submitted in response to one or more previous solution requests. As detailed herein, solutioning concepts can include tasks, artifacts, decisions, issues, risks, assumptions and/or conditions pertaining to a solution under design. Step 404 includes decomposing each solution document into one or more segments pertaining to information regarding a specific solutioning concept.

As described herein, a segment can include one or more of a value proposition of the solution, a need of a client making the solution request, the nature of the relationship between a client making the solution request and a solution provider, a solution architecture, a delivery model, a staffing model, an estimation and/or costing model, a pricing model, and an identification of risk and/or assumptions.

Step 406 includes tagging one or more keywords of interest in each segment, wherein the keywords pertain to a specific solutioning concept. Step 408 includes indexing the one or more segments of each solution document into a repository with the one or more keywords configured as one or more search facets. Step 410 includes running a solution request against the repository to identify one or more segments with a tag that corresponds to content of the solution request.

Step 412 includes weighting the identified segments based on one or more characteristics (or needs) of the solution request. Step 414 includes ranking the weighted identified segments based on coverage in the solution request. Step 416 includes selecting one or more of the highest-ranked segments to be provided as a solution recommendation. Additionally, at least one embodiment of the invention includes outputting the highest-ranked segment to a display.

The techniques depicted in FIG. 4 can also include auto-summarizing the existing solutioning documents and using the summarizations to search for targeted information in the existing solutioning documents. Further, at least one embodiment of the invention includes identifying one or more experts to work on segments based on characteristics of the solution request and/or information captured in already authored segments in the solution being prepared. Also, the techniques depicted in FIG. 4 can include bootstrapping delivery of the solution such that solution work-products are leveraged during delivery, as well as automatically assigning solution managers to form a team to design a solution based on information on characteristics of the solution request, availability, skill and expertise level of multiple solution managers in a vendor organization, etc.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system; as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
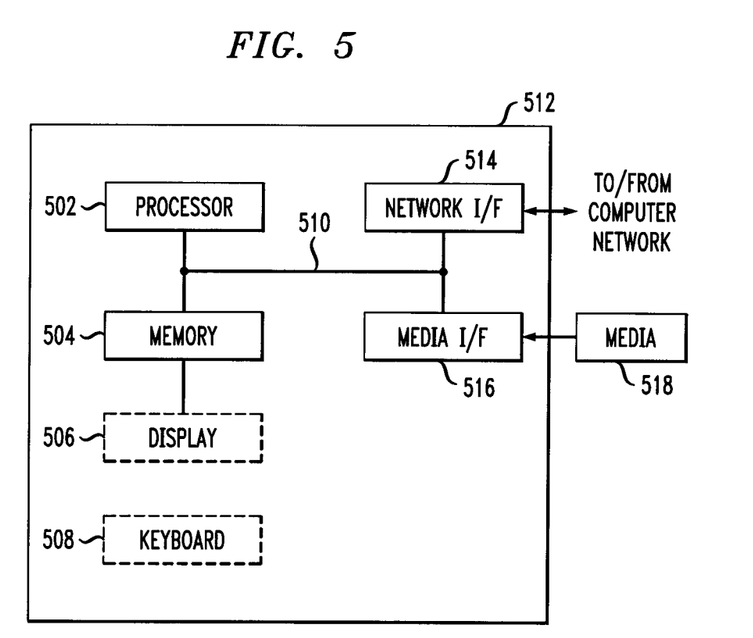
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, applying semantic information extraction and contextual searching for enterprise solution design processes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying one or more solution segments in response to a current solution request, at least a portion of the method being performed by a computing device comprising at least one processor, the method comprising:

aggregating multiple work-products pertaining to solutions submitted in response to one or more previous solution requests;

segmenting the multiple work-products into multiple segments based on content category;
annotating each of the multiple segments with a tag based on one or more semantic associations with the content of each of the segments;
adding each of the segments and each of the tags into a database;
performing a search in the database to identify a set of one or more of the segments with at least one tag that corresponds to content of a current solution request;
weighting each of the segments based on one or more characteristics of the current solutions request; and
ranking the weighted segments based on a degree of semantic matching with one or more parts of the current solution request.

2. The method of claim 1, wherein each of the segments includes one or more of a value proposition of a solution being prepared in response to the current solution request, a need of a client making the current solution request, the nature of a relationship between a client making the current solution request and a solution provider, a solution architecture, a delivery model, a staffing model, an estimation and/or costing model, a pricing model, and an identification of risk and/or assumptions.

3. The method of claim 1, comprising:
outputting said ranking of the segments in the set to a display.

4. The method of claim 1, comprising:
adding structured information to each of the segments in the database as meta-data.

5. The method of claim 1, comprising:
identifying a pre-existing tag associated with one or more of the segments.

6. The method of claim 5, comprising:
adding the pre-existing tag to each of the corresponding segments as meta-data.

7. The method of claim 1, wherein said annotating comprises annotating one or more of the segments with a new fuzzy tag.

8. The method of claim 1, comprising:
weighting each of the tags based on one or more solution needs.

9. The method of claim 1, wherein said ranking comprises ranking each of the segments based on at least one of (i) coverage in the current solution request, (ii) relevance to information already captured in the solution under preparation, (iii) recency of the work-product from where each of the segments is derived, (iv) relevance to a role of a person to whom each of the segments is provided, (v) one or more indicators about quality of a past solution from where each of the segments is derived, (vi) a user rating of each of the segments, and (vii) an automatically computed popularity score for each of the segments based on the number of times each of the segments has been downloaded from the database.

10. The method of claim 1, comprising:
performing a semantic search over the segments pertaining to solutions submitted in response to one or more previous solution requests based on one or more solution request characteristics to generate one or more content recommendations for the solution request.

11. The method of claim 1, comprising:
considering one or more risks, one or more issues, one or more assumptions and/or one or more preconditions pertaining to the current solution request.

12. The method of claim 1, comprising:
identifying one or more experts to work on one or more of the segments based on characteristics of the current solution request and/or information captured in one or more already authored segments in a solution being prepared in response to the current solution request.

13. The method of claim 1, comprising:
bootstrapping delivery of a solution prepared in response to the current solution request such that the segments are leveraged during delivery.

14. The method of claim 1, comprising:
automatically assigning one or more solution managers to form a team to design a solution based on characteristics of the current solution request, and availability, skill and expertise level of multiple solution managers.

15. The method of claim 1, comprising:
considering input pertaining to one or more client properties and intent expressed in the current solution request.

16. An article of manufacture comprising a non-transitory computer readable storage medium having computer readable instructions tangibly embodied thereon which, when implemented, cause a computer to carry out a plurality of method steps comprising:
aggregating multiple work-products pertaining to solutions submitted in response to one or more previous solution requests;
segmenting the multiple work-products into multiple segments based on content category;
annotating each of the multiple segments with a tag based on one or more semantic associations with the content of each of the segments;
adding each of the segments and each of the tags into a database;
performing a search in the database to identify a set of one or more of the segments with at least one tag that corresponds to content of a current solution request;
weighting each of the segments based on one or more characteristics of the current solutions request; and
ranking the weighted segments based on a degree of semantic matching with one or more parts of the current solution request.

17. The article of manufacture of claim 16, wherein each of the segments includes one or more of a value proposition of a solution being prepared in response to the current solution request, a need of a client making the current solution request, the nature of a relationship between a client making the current solution request and a solution provider, a solution architecture, a delivery model, a staffing model, an estimation and/or costing model, a pricing model, and an identification of risk and/or assumptions.

18. The article of manufacture of claim 16, wherein said ranking comprises ranking each of the segments based on at least one of (i) coverage in the current solution request, (ii) relevance to information already captured in the solution under preparation, (iii) recency of the work-product from where each of the segments is derived, (iv) relevance to a role of a person to whom each of the segments is provided, (v) one or more indicators about quality of a past solution from where each of the segments is derived, (vi) a user rating of each of the segments, and (vii) an automatically computed popularity score for each of the segments based on the number of times each of the segments has been downloaded from the database.

19. A computing system for identifying one or more solution segments in response to a solution request, comprising:
at least one distinct software module, each distinct software module being embodied on a tangible computer-readable medium executed on a computing device;
a memory; and
at least one processor coupled to the memory and operative for:

aggregating multiple work-products pertaining to solutions submitted in response to one or more previous solution requests;

segmenting the multiple work-products into multiple segments based on content category;

annotating each of the multiple segments with a tag based on one or more semantic associations with the content of each of the segments;

adding each of the segments and each of the tags into a database;

performing a search in the database to identify a set of one or more of the segments with at least one tag that corresponds to content of a current solution request;

weighting each of the segments based on one or more characteristics of the current solutions request; and ranking the weighted segments based on a degree of semantic matching with one or more parts of the current solution request.

20. A computer-implemented method for providing a solution recommendation based on segments of previous solution documents, at least a portion of the method being performed by a computing device comprising at least one processor, the method comprising:

automatically harvesting existing solution documents submitted in response to one or more previous solution requests;

decomposing each solution document into one or more segments pertaining to information regarding a specific solutioning concept;

tagging one or more keywords of interest in each of the one or more segments, said one or more keywords pertaining to a specific solutioning concept;

indexing the one or more segments of each solution document into a repository with the one or more keywords configured as one or more search facets;

running a current solution request against the repository to identify one or more of the segments with a tag that corresponds to content of the current solution request;

weighting the identified segments based on one or more characteristics of the current solution request;

ranking the weighted identified segments based on coverage in the current solution request; and selecting one or more of the highest-ranked segments to be provided as a solution recommendation for the current solution request.

* * * * *